United States Patent
Daube et al.

(10) Patent No.: US 11,144,634 B2
(45) Date of Patent: Oct. 12, 2021

(54) ACCESS CONTROL FOR INTEGRATED CIRCUIT DEVICES

(71) Applicants: Nitzan Daube, Tel Aviv (IL); Eran Fine, Tel Aviv (IL); Shlomo Oren, Rannana (IL)

(72) Inventors: Nitzan Daube, Tel Aviv (IL); Eran Fine, Tel Aviv (IL); Shlomo Oren, Rannana (IL)

(73) Assignee: NANOLOCK SECURITY INC., Nitzanei Oz (IL)

( * ) Notice: Subject to any disclaimer, the term of this patent is extended or adjusted under 35 U.S.C. 154(b) by 845 days.

(21) Appl. No.: 15/715,316

(22) Filed: Sep. 26, 2017

(65) Prior Publication Data

US 2018/0089420 A1     Mar. 29, 2018

Related U.S. Application Data

(60) Provisional application No. 62/400,740, filed on Sep. 28, 2016.

(51) Int. Cl.
*G06F 21/78* (2013.01)
*G06F 21/50* (2013.01)
*G06F 21/74* (2013.01)

(52) U.S. Cl.
CPC .............. *G06F 21/50* (2013.01); *G06F 21/74* (2013.01); *G06F 21/78* (2013.01); *G06F 2221/2141* (2013.01); *G06F 2221/2143* (2013.01)

(58) Field of Classification Search
CPC .......... G06F 21/78; G06F 21/50; G06F 21/74; G06F 2221/2141; G06F 2221/2143; G06F 21/70
See application file for complete search history.

(56) References Cited

U.S. PATENT DOCUMENTS 5,056,009 A * 10/1991 Mizuta ................. G06F 21/123
                                                      711/163
5,388,156 A *  2/1995 Blackledge, Jr. ....... G06F 21/86
                                                       726/19

(Continued)

FOREIGN PATENT DOCUMENTS

CN          204189172 U  *  3/2015  ............. G06F 21/62

OTHER PUBLICATIONS

CN204189172U to LIN (Machine Translation) (Mar. 4, 2015) (Year: 2015).*

*Primary Examiner* — Theodore C Parsons
(74) *Attorney, Agent, or Firm* — Morgan, Lewis & Bockius LLP

(57) ABSTRACT

Security systems for microelectronic devices physically lock the hardware itself and serve as a first line of defense by preventing overwriting, modification, manipulation or erasure of data stored in a device's memory. Implementations of the security systems can respond to lock/unlock commands that do not require signal or software interactivity with the functionality of the protected device, and which therefore may be consistent across devices. In various embodiments, a security device passively "listens" on data lines of the protected device and, when a lock or unlock command is received (typically in conjunction with a valid authentication code), the security device physically blocks or allows passage of signals to and from the protected device.

21 Claims, 5 Drawing Sheets

(56) References Cited

U.S. PATENT DOCUMENTS

| | | | | |
|---|---|---|---|---|
| 5,426,745 A | * | 6/1995 | Baji | G06K 9/522 |
| | | | | 345/469 |
| 6,598,165 B1 | * | 7/2003 | Galasso | G06F 21/79 |
| | | | | 713/156 |
| 9,092,628 B2 | | 7/2015 | Barkan | |
| 2002/0105842 A1 | * | 8/2002 | Uchida | G11C 7/1078 |
| | | | | 365/205 |
| 2005/0060540 A1 | * | 3/2005 | Okaue | G06F 21/10 |
| | | | | 713/160 |
| 2005/0201156 A1 | * | 9/2005 | Tokiwa | G11C 16/22 |
| | | | | 365/185.22 |
| 2006/0192653 A1 | * | 8/2006 | Atkinson | G06F 21/88 |
| | | | | 340/5.61 |
| 2008/0263286 A1 | * | 10/2008 | Jeong | H04M 1/72522 |
| | | | | 711/149 |
| 2010/0250968 A1 | * | 9/2010 | Sadler | G06F 21/554 |
| | | | | 713/193 |
| 2013/0024153 A1 | * | 1/2013 | Hadley | G06F 21/55 |
| | | | | 702/117 |
| 2013/0305324 A1 | * | 11/2013 | Alford, Jr. | G06F 21/31 |
| | | | | 726/5 |

* cited by examiner

| STATUS - READ | STATUS - WRITE | CHANGE STATUS | COMMENTS |
|---|---|---|---|
| OPEN FOR READ | CLOSE FOR WRITE | READ - NO NEED<br>WRITE - PERMISSION | DEFAULT |
| OPEN FOR READ | OPEN FOR WRITE | PERMISSION | |
| CLOSED FOR READ | CLOSE FOR WRITE | READ - PERMISSION<br>WRITE - PERMISSION | |

ACCESS CONTROL FOR INTEGRATED CIRCUIT DEVICES

CROSS-REFERENCE TO RELATED APPLICATION

This application claims priority to and the benefit of, and incorporates herein by reference in its entirety, U.S. Provisional Patent Application No. 62/400,740, which was filed on Sep. 28, 2016.

FIELD OF THE INVENTION

In various embodiments, the present invention relates generally to security measures for electronic devices, and in particular to controlling access to integrated circuit (IC) devices.

BACKGROUND

Processor-driven controllers have, like computers, become ubiquitous due to their convenience, processing capacity and/or data-storage capacity. "Embedded" controllers operate devices ranging from refrigerators to pacemakers, and today's automobiles are as much computational as mechanical systems. The very features that make such controllers attractive render them, and therefore the systems they control, vulnerable to attack. For example, for a "smart appliance" to offer its owner the convenience of remote monitoring and control, it must receive and respond to user commands. If a hacker can "spoof" the controller and obtain access, he may be able not only to misuse the appliance but potentially also obtain the user's private information.

Existing systems for securing control devices from attack, such as encryption protocols and/or passwords, tend to be solely software-based. Such approaches can be highly specific to the protected system, which may itself evolve over time, and are vulnerable to hacking. They also generate latency and require CPU power. Therefore, there is a need for security systems for computational devices that address the shortcomings of software-based solutions while both preventing access by unauthorized parties and enabling convenient access by authorized parties.

SUMMARY

Embodiments of the present invention provide a solution that physically locks the hardware itself and is compatible with virtually any digital device. It can serve as a first line of defense by preventing overwriting, modification, manipulation or erasure of data stored in the device's memory. Implementations of the invention can respond to lock/unlock commands that do not require signal or software interactivity with the functionality of the protected device, and which therefore may be consistent across devices. In various embodiments, a security device passively "listens" on data lines of the protected device and, when a lock or unlock command is received (typically in conjunction with a valid authentication code), the security device physically blocks or allows passage of signals to and from the protected device.

Advantageously, embodiments of the invention provide backward compatibility with bus architectures and other hardware typically utilized to interface with the protected device. Moreover, various implementations maintain high-speed access for the device being protected and result in virtually no signal latency, at least when the device is "unlocked."

Accordingly, in a first aspect, the invention pertains to a security device. In various embodiments, the security device comprises read enable (RE) input and output terminals, write enable (WE) input and output terminals, a plurality of input lines connectable to data lines of a device to be protected, an RE switch intervening between the input and output RE terminals, a WE switch intervening between the input and output WE terminals, and a lock unit connected to the input lines and the switches. The lock unit may comprise, consist of or consist essentially of a decision logic block for (i) detecting a command signal on the input lines, (ii) detecting a permission code on the data lines, (iii) decoding the command signal and generating a lock/unlock state in response to the decoded signal, and (iv) during the decoding and lock/unlock-state generation, opening the switches to prevent signals on the input terminals from reaching the output terminals; a non-volatile memory for storing the lock/unlock state; and circuitry responsive to the non-volatile memory for operating the switches in accordance with the lock/unlock state. In some embodiments, the device further comprises chip enable (CE) input and output terminals and a CE switch intervening between the input and output CE terminals.

The lock/unlock state may, for example, comprise a WE result and a RE result. The circuitry responsive to the non-volatile memory may comprise a volatile latch for receiving the state from the non-volatile memory and latching the state, and logic circuitry for applying the latched state to the switches. Application of the latched state to the switches may close the RE switch only if the RE result is positive and closes the WE switch only if both the RE and WE results are positive. The logic circuitry may, for example, comprise first and second OR gates receiving inputs from the latch and from a soft lock line of the decision block, where the soft lock line is high only during decoding and unlock-state generation and otherwise is low. The switches may be CMOS gates or other suitable switches. In some embodiments, the command signal includes the permission code.

The device may further include memory, accessible by the decision logic block, for storing a one-time pad base; the decision logic block is configured to compare the permission code to an entry in the one-time pad base. Alternatively, the memory may store a shared secret, the decision logic block being configured to compare the permission code to the stored shared secret.

The decision logic block may be configured to respond to an invalid permission code by not processing permission codes and/or command signals for a first time interval. The decision logic block may be further configured to respond to a second invalid permission code detected after expiration of the first time interval by not processing permission codes and/or command signals subsequently applied to the CE input terminal for a second time interval longer than the first time interval.

In another aspect, the invention relates to a controller. In various embodiments, the controller comprises an output interface for causing performance of at least one control function, a memory including stored control instructions, a processor for executing the stored control instructions and operating the output interface in accordance therewith, and a security device governing access to at least a portion of the memory to be protected. The security device may comprise, consist of or consist essentially of a plurality of switches connected to at least one control line of the memory to be protected, and a lock unit connected to the switches, where the lock unit comprises a decision logic block for (i) detecting a command signal, (ii) detecting a permission code, (iii) decoding the command signal and generating a lock/unlock state in response to the decoded signal, and (iv) during the decoding and lock/unlock-state generation, opening the switches to prevent access to the memory to be protected; a non-volatile memory for storing the lock/unlock state; and circuitry responsive to the non-volatile memory for operating the switches in accordance with the lock/unlock state. In some embodiments, the controller further comprises a plurality of input lines connected to data lines of the memory to be protected, where the command signals are detected over the input lines. The memory to be protected may comprise RE input and output terminals and WE input and output terminals, where the switches comprise an RE switch intervening between the input and output RE terminals and a WE switch intervening between the input and output WE terminals. The controller may further comprise CE input and output terminals and a CE switch intervening between the input and output CE terminals.

The lock/unlock state may, for example, comprise a WE result and a RE result. The circuitry responsive to the non-volatile memory may comprise a volatile latch for receiving the state from the non-volatile memory and latching the state, and logic circuitry for applying the latched state to the switches. Application of the latched state to the switches may close the RE switch only if the RE result is positive and closes the WE switch only if both the RE and WE results are positive. The logic circuitry may, for example, comprise first and second OR gates receiving inputs from the latch and from a soft lock line of the decision block, where the soft lock line is high only during decoding and unlock-state generation and otherwise is low. The switches may be CMOS gates or other suitable switches. In some embodiments, the command signal includes the permission code.

The controller may further include memory, accessible by the decision logic block, for storing a one-time pad base; the decision logic block is configured to compare the permission code to an entry in the one-time pad base. Alternatively, the memory may store a shared secret, the decision logic block being configured to compare the permission code to the stored shared secret.

The decision logic block may be configured to respond to an invalid permission code by not processing permission codes and/or command signals for a first time interval. The decision logic block may be further configured to respond to a second invalid permission code detected after expiration of the first time interval by not processing permission codes and/or command signals subsequently applied to the CE input terminal for a second time interval longer than the first time interval.

The controller may include a user interface for accepting user commands, and may have a wireless interface, in which case the processor may be configured to accept remote user commands via the wireless interface. The memory to be protected may store user-specified control programming and/or user-specified parameter values.

Still another aspect of the invention pertains to an "Internet of things" (IoT) device. In various embodiments, the IoT device comprises a control module for performing a data-gathering or control function, an interface facilitating communication via a network protocol, the control module being responsive to commands received via the interface, a memory, and a security device governing access to at least a portion of the memory to be protected. The security device may comprise, consist of or consist essentially of a plurality of switches connected to at least one control line of the memory to be protected, and a lock unit connected to the switches, where the lock unit comprises a decision logic block for (i) detecting a command signal, (ii) detecting a permission code, (iii) decoding the command signal and generating a lock/unlock state in response to the decoded signal, and (iv) during the decoding and lock/unlock-state generation, opening the switches to prevent access to the memory to be protected; a non-volatile memory for storing the lock/unlock state; and circuitry responsive to the non-volatile memory for operating the switches in accordance with the lock/unlock state. In some embodiments, the controller further comprises a plurality of input lines connected to data lines of the memory to be protected, where the command signals are detected over the input lines. The memory to be protected may comprise RE input and output terminals and WE input and output terminals, where the switches comprise an RE switch intervening between the input and output RE terminals and a WE switch intervening between the input and output WE terminals. The controller may further comprise CE input and output terminals and a CE switch intervening between the input and output CE terminals.

The lock/unlock state may, for example, comprise a WE result and a RE result. The circuitry responsive to the non-volatile memory may comprise a volatile latch for receiving the state from the non-volatile memory and latching the state, and logic circuitry for applying the latched state to the switches. Application of the latched state to the switches may close the RE switch only if the RE result is positive and closes the WE switch only if both the RE and WE results are positive. The logic circuitry may, for example, comprise first and second OR gates receiving inputs from the latch and from a soft lock line of the decision block, where the soft lock line is high only during decoding and unlock-state generation and otherwise is low. The switches may be CMOS gates or other suitable switches. In some embodiments, the command signal includes the permission code.

The IoT device may further include memory, accessible by the decision logic block, for storing a one-time pad base; the decision logic block is configured to compare the permission code to an entry in the one-time pad base. Alternatively, the memory may store a shared secret, the decision logic block being configured to compare the permission code to the stored shared secret.

The decision logic block may be configured to respond to an invalid permission code by not processing permission codes and/or command signals for a first time interval. The decision logic block may be further configured to respond to a second invalid permission code detected after expiration of the first time interval by not processing permission codes and/or command signals subsequently applied to the CE input terminal for a second time interval longer than the first time interval.

In some embodiments, the control module of the IoT device is configured to perform a control function corresponding to control of a household system. For example, the control module may be configured to perform a data-gathering function corresponding to image acquisition of a monitored area. Alternatively or in addition, the control module may be configured to perform a control function corresponding to control of a household system. The IoT device may include a router configured to accept remote user commands via Internet Protocol. The memory to be protected may store data gathered by the IoT device, user information, or a combination.

In still another aspect, the invention pertains to a control system for a vehicle. In various embodiments, the control system comprises a plurality of sensors for sensing vehicle parameters during operation thereof; a control platform comprising a port interface, a processor, and a memory for storing values of the sensed parameters; and a security device governing access to at least a portion of the memory. The security device may comprise, consist of or consist essentially of a plurality of switches connected to at least one control line of a protected portion of the control platform and a lock unit connected to the switches. The lock unit may comprise a decision logic block for (i) detecting a command signal, (ii) detecting a permission code, (iii) decoding the command signal and generating a lock/unlock state in response to the decoded signal, and (iv) during the decoding and lock/unlock-state generation, opening the switches to prevent access to the protected portion of the control platform; a non-volatile memory for storing the lock/unlock state; and circuitry responsive to the non-volatile memory for operating the switches in accordance with the lock/unlock state.

The protected portion of the control platform may be the memory, the port interface, and/or the processor. The control system may further comprise a plurality of modules each configured to perform a vehicle-control function, the processor being configured to store, in the memory, data representative of the vehicle-control functions. Vehicle parameters may include cruise status, throttle position, engine speed, and/or road speed. In some embodiments, the vehicle-control functions include speed control and fuel control. Memory to be protected may store user information and/or vehicle information.

The memory may comprise RE input and output terminals and WE input and output terminals, where the switches comprise an RE switch intervening between the input and output RE terminals and a WE switch intervening between the input and output WE terminals. In some embodiments, the memory further comprises CE input and output terminals and a CE switch intervening between the input and output CE terminals. The lock/unlock state may comprise a WE result and a RE result. The circuitry responsive to the non-volatile memory may comprise a volatile latch for receiving the state from the non-volatile memory and latching the state, and logic circuitry for applying the latched state to the switches. Application of the latched state to the switches may close the RE switch only if the RE result is positive and closes the WE switch only if both the RE and WE results are positive. The logic circuitry may, for example, comprise first and second OR gates receiving inputs from the latch and from a soft lock line of the decision block, where the soft lock line is high only during decoding and unlock-state generation and otherwise is low. The switches may be CMOS gates or other suitable switches. In some embodiments, the command signal includes the permission code.

The control system may further include memory, accessible by the decision logic block, for storing a one-time pad base; the decision logic block is configured to compare the permission code to an entry in the one-time pad base. Alternatively, the memory may store a shared secret, the decision logic block being configured to compare the permission code to the stored shared secret.

The decision logic block may be configured to respond to an invalid permission code by not processing permission codes and/or command signals for a first time interval. The decision logic block may be further configured to respond to a second invalid permission code detected after expiration of the first time interval by not processing permission codes and/or command signals subsequently applied to the CE input terminal for a second time interval longer than the first time interval.

As used herein, the terms "approximately," "roughly," and "substantially" mean ±10%, and in some embodiments, ±5%. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

A. Core Architecture

Figures 1, 2:
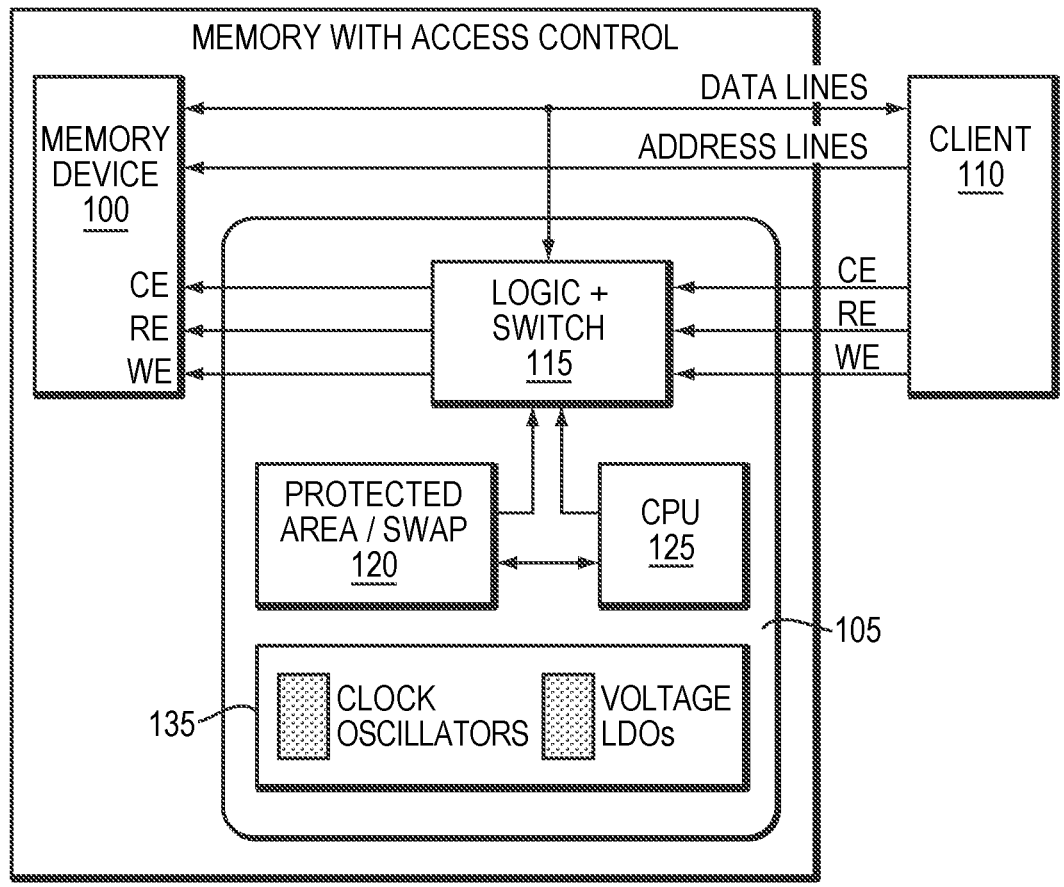
FIG. 1 schematically illustrates an exemplary security device in accordance with various embodiments of the present invention, implemented to control access to a memory device.
FIG. 2 is a table showing a representative set of allowed state transitions.

Refer first to FIG. 1, which illustrates a system-level view of a memory device 100 protected in accordance with embodiments of the invention. An access-control circuit 105 governs the ability of a client device 110 to interact with the memory device 100. The memory device 100 may be any type of volatile (e.g., random-access memory (RAM) or even cache memory) or non-volatile (e.g., Flash such as NOR Flash or NAND Flash) storage, and may be a single discrete device as illustrated or a series or "bank" of devices operating in tandem. Typically, memory device 100 is chip-based and includes a matrix of memory cells addressed by a plurality of address lines and receiving or supplying data via a plurality of data lines (in some cases, the address and data lines share the same bus). It should be understood, however, that the present invention may also be used with control (e.g., microcontroller), processor (e.g., CPU), "system on chip" or other VLSI devices with resident or embedded memory—essentially any device that a client device 110 may seek to access for purposes of data retrieval, data storage, and/or device operation. In the illustrated system, memory device 100 includes three control lines: chip enable (CE, sometimes referred to as "chip select"), read enable (RE) and write enable (WE). The client device 110 sends signals on these control lines to operate the memory 100. For example, suppose CE, RE and WE are enabled when high. To read data from the memory 100, the address of the byte to be fetched is presented on the address lines. CE and then RE are brought high, which enables the output on the data lines (which are normally tri-stated when CE is low). After a delay known as the access time, the contents of the byte in memory device 100 will be available on the data lines. After reading the data, CE and WE can be brought low again. To write a byte, its destination address is presented on the address lines. CE is brought high, the data to be written is applied to the address lines, and WE is brought high to write the data into memory. It should be understood that the client device 110 may be any device capable of interacting with memory device 100; thus, client device 110 may be a computer, a microprocessor, a controller, etc.

In the illustrated system, access-control circuit 105 intervenes between the CE, RE and WE control pins (or other interface hardware) on memory device 100 and the complementary control pins on client device 110. The lines connecting these control pins pass through a lock unit 115 that determines whether signals thereon will be allowed to pass between memory device 100 and client device 110. In addition, lock unit 115 is passively connected to the data lines so as to be able to "listen," without disrupting or modifying, data signals thereon. Depending on the configuration, lock unit 105 may include additional elements such as a secure internal data store 120 that may hold keys, access codes (e.g., shared secret, one-time pad ("OTP") codes, or other authentication codes), registers for data swapping or other operations, etc. A central processing unit (CPU) 125 may be included to manage the internal data store 120 and implement the operations associated with the lock unit 115, and the circuitry may include other support elements generically indicated at 135 and including, for example, clock oscillators and voltage regulators.

In FIG. 1, the memory device 100 and the lock unit 115 are shown within a single block, meaning that both elements 100, 115 reside within a single chip—e.g., lock unit 115 may be implemented within and as part of memory device 100, or both may be implemented as part of a processor chip or "system-on-chip" device. But other architectures are possible, e.g., lock unit 115 may be a stand-alone chip (e.g., an ASIC) or may even be implemented within client device 110.

The basic function of the lock unit 115 is to enforce a state-based security protocol that grants or changes the degree of access that the device 110 has to the memory device only upon receipt of a valid permission code. Device 110 provides the permission code to the lock unit 115 via the data lines; in general, lock unit 115 is always listening to signals on the data lines and reacts when it detects a data sequence (i.e., a bitstream) corresponding to a recognized command. These commands may instruct lock unit 115 to report the current lock/unlock state (hereafter, for simplicity, a "lock state") on the data lines, change the lock state, or reprogram the functionality of the lock unit 115. In some embodiments, some or all commands are executed only if followed by a valid permission code, or in some implementations, if a command is received within an allowed interval following receipt of a valid permission code. Lock unit 115 may also implement measures to report or otherwise handle unauthorized permission codes. These measures may comprise an exclusion interval following detection of an unauthorized permission code during which CPU 125 does not process codes subsequently presented on the data lines. The exclusion interval may increase with each unauthorized code detected (at least within a particular time interval) in order to thwart brute-force incursion attempts. Responsive measures may further include setting a flag or sending an alert, for example, upon detection of repeated unauthorized codes.

The current lock state is stored internally in data store 120, and a representative set of allowed lock states is illustrated in FIG. 2. The allowed states may include a read status and a write status, with reading permitted and writing forbidden being the default state. The command changing the write status from closed to open requires a permission code, but changing the read status to closed requires no permission. If the lock state is read=open and write=open, or read=closed and write=closed, a change to either the read or write status requires a permission code. The states depicted in FIG. 2 are only exemplary and may be different in various implementations of the present invention. For example, in various embodiments no permission code may be required to change the lock state for read and/or write from open to closed.

In some embodiments, the permission code is a "shared secret," i.e., a password, a pre-shared key, or the equivalent that may be specific (in the manner of a serial number) to lock unit 115 and/or provided to users and/or client devices 110 on a restricted basis. Alternatively, permissions may be handled using an OTP scheme in which internal store 120 contains a plurality of keys (e.g., as entries in an OTP base), each used only once, that are also stored in the same order on device 110. It should be understood, however, that any suitable security or cryptography scheme (e.g., public-key cryptography) may be employed. In various embodiments, the permission code(s) may be updated or reprogrammed by a user (e.g., utilizing device 110) following successful authentication of the user by the lock unit 115. For example, an OTP base may be replaced or updated to include additional entries, or a shared secret may be changed, by the authenticated user.

Figure 3:
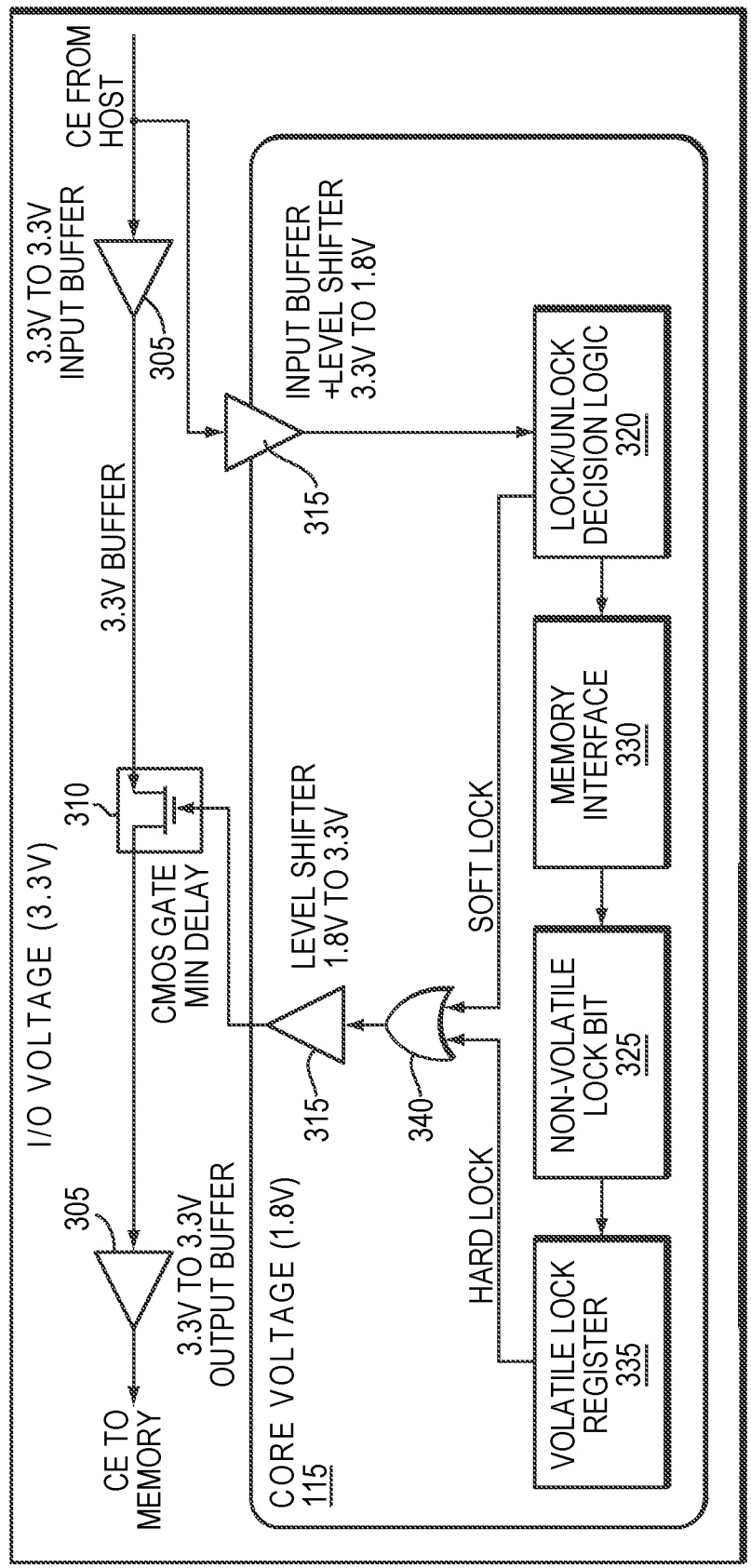
FIG. 3 schematically illustrates, in greater detail, the logic and switch elements of the embodiment depicted in FIG. 1.
Figure 4:
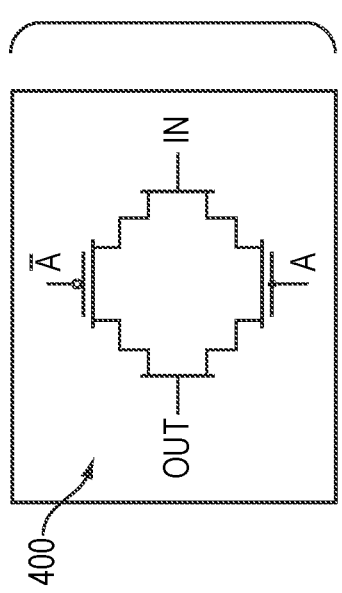
FIG. 4 schematically illustrates a representative CMOS switch configuration.

FIG. 3 depicts portions of a representative lock unit 115 in greater detail. In the illustrated configuration, the memory device (not shown in FIG. 3) operates at 3.3 V, and hence, signals on the address, data and control lines are high at this voltage and low at approximately 0 V. A pair of buffers 305 maintains this operating voltage on each control line (for ease of illustration, only the CE control line is shown in FIG. 3; in various embodiments the RE and WE control lines interface with lock unit 115 in a similar fashion). A switch 310, under the control of lock unit 115, is closed only if the lock state permits data exchange between the access-seeking device 110 and the memory 100 over the access-controlled line. Thus, in the default state, the CE and RE switches would be closed (enabling data exchange) and the WE switch would be open (preventing data exchange). The switch 310, as illustrated, also operates at 3.3 V and may be a CMOS gate, such as the simple two-transistor gate 400 shown in FIG. 4, or other solid-state device(s). Indeed, the switch 310 may be as simple as a single MOSFET, but may be configured to minimize switching delay and power consumption. The switch 310 may alternatively be an electro-mechanical (i.e., MEMS), electro-optical or other type of electronic switch.

The illustrated lock unit 115 operates at 1.8 V and therefore includes input and output level-shifting buffers 315. In various embodiments of the invention, level-shifting buffers 315 are unnecessary or absent when the lock unit 115 and the device protected thereby operate at approximately the same voltage. A lock/unlock decision logic block 320 determines whether the lock state is changed based on system status and commands received by the lock unit 115. For example, on power-up, the decision logic 320 may set the switches 310 to conform to the previously stored state or the default state. Decision logic 320 may be implemented as a finite-state machine, with register and read-only memory (ROM) components that map inputs and a current state to an output state, or may instead be implemented in software executed by CPU 125 (see FIG. 1) or hard-wired as a network of logic gates.

The output of decision logic 320 is provided to a non-volatile register 325 via a conventional memory interface 330 that enables CPU 125 to operate the register. The register 325 stores, for each control line, a bit corresponding to the switch state for that line. Circuitry responsive to the non-volatile lock bit 325 operates the corresponding switch in accordance with the bit state. In the illustrated embodiment, this circuitry is a volatile latch 335 and an OR gate 340. The OR gate is used so that the switch 310 can be retained in a default (typically open, preventing data interchange) state—a "soft lock" state—while the decision logic 320 receives and processes the bit sequence corresponding to the unlock code. In general, the decision logic 320 directly implements the state-based scheme as representatively shown in FIG. 2 and dictates the WE and RE signal levels. In some embodiments, the decision logic can be reprogrammed by the user (e.g., using the device 310). Even in these cases, certain foundational rules may underlie all allowable state-based schemes, e.g., the latched state may be permitted to close the RE switch if the latched RE result is positive but may be permitted to close the WE switch only if both the latched RE and WE results are positive.

B. Applications

As noted, the present invention may be deployed across a wide range of embedded and stand-alone systems, particularly those that include an on-board memory store and interact with users via wired or wireless connections. The below focuses on several representative applications.

B.1 Controllers

Figure 5:
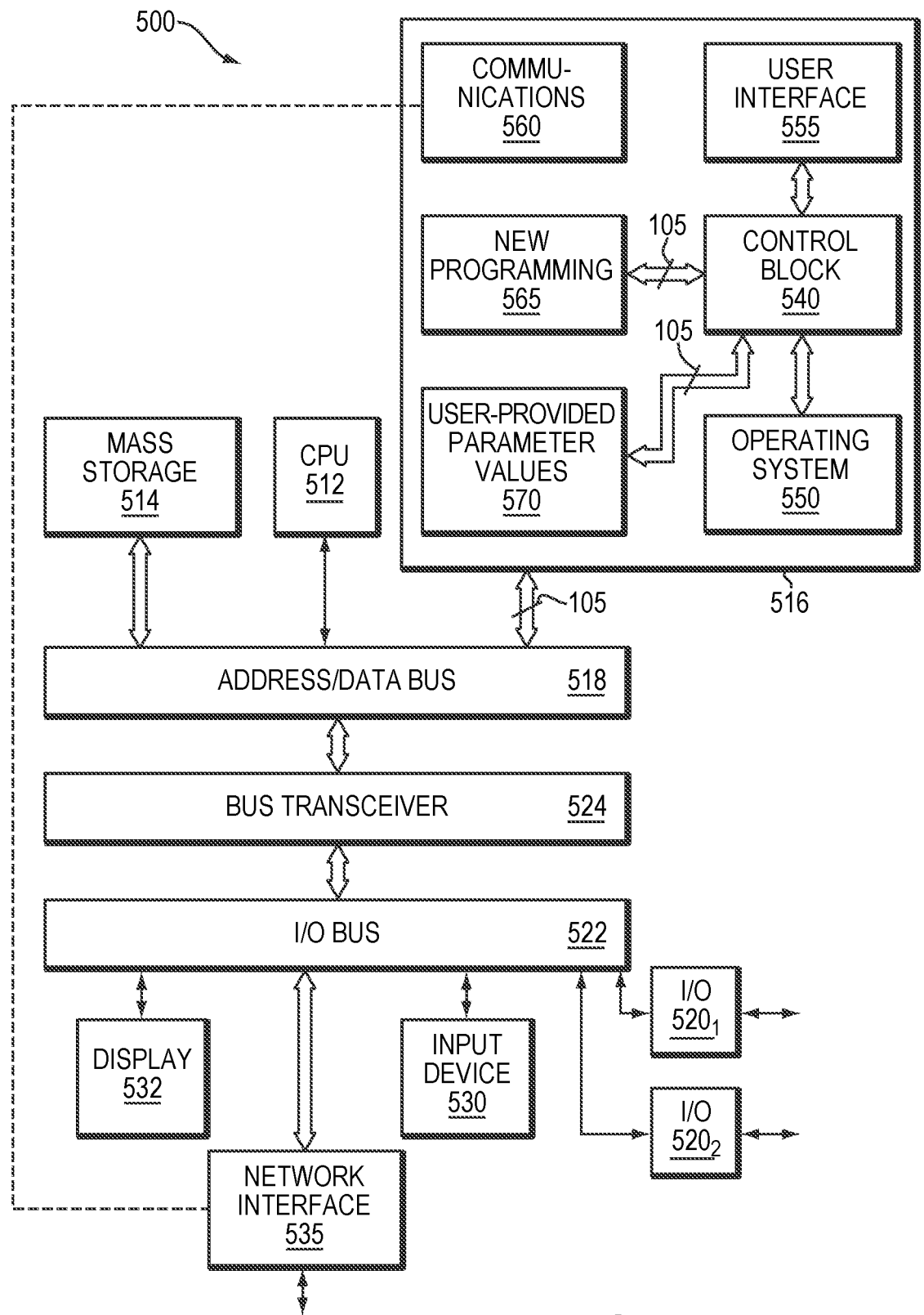
FIG. 5 schematically illustrates a programmable controller architecture in accordance with various embodiments of the invention.

FIG. 5 illustrates a programmable controller architecture that may, depending on configuration and scaling, operate industrial machinery (e.g., valves in a refinery), a robot, an appliance, a medical device, a vehicle, or virtually any other device or system amenable to programmed control. The illustrated controller 500 includes a central processing unit (CPU) (typically a microcomputer or microcontroller) 512 and one or more computer storage devices indicated generally at 514, 516. Ordinarily, storage device 514 provides nonvolatile mass storage, and may be, for example, Flash and/or disk memory; and storage 516 comprises a combination of RAM for temporary storage and processing, and non-volatile, programmable read-only memory (PROM) that contains permanent aspects of the system's operating instructions.

CPU 512 and computer storage 514, 516 communicate over an internal system bus 518. The controller 200 further includes a series of input/output (I/O) modules shown representatively at 520₁, 520₂ that sense the condition of, and/or send control signals to, the controlled device over a machine interface. This machine interface, which may be as simple as a direct connection or can involve a communication link for interaction over a computer network or telephone lines, facilitates the bidirectional exchange of signals between each I/O module 520 and an associated device (e.g., a sensor or an actuator). Hence, the controller 500 may operate virtually any type of controlled device. I/O modules 520 may, in some embodiments (particularly those involving industrial control), connect to a secondary I/O bus 522, which is driven by a bus transceiver 524; in effect, buses 518, 522 and bus transceiver 524 form a single logical bus.

Optionally, the controller 500 may include one or more input devices 530, also connected to I/O bus 522, that permit the operator to program the controller and/or enter information. The output of either device can be used to designate information or to select particular areas of a screen display 532. In some implementations, input devices 530 may include a keyboard and a position-sensing device such as a mouse. In embedded implementations, by contrast, the controller 500 typically includes no display or peripheral devices, and a user's interaction with the controller 500 occurs via a wired or wireless connection—e.g., using a general-purpose device such as a "smart phone" or tablet running a program (or "app") configured to establish communication with the controller 500 and provide the user interface on its own display. A conventional network interface 535, which may be wired (e.g., ETHERNET) or wireless (e.g., 802.11x or cellular) or, in some embodiments, provide for both wired and wireless communications, also transmits and receives signals via I/O bus 522.

Storage 516 contains a series of functional blocks or modules that implement the functions performed by controller 500 through operation of CPU 512. A control block 540 contains computer-executable instructions for actually operating controlled equipment via I/O modules 520, as well as storing data gathered by controller 500 via I/O modules 520. Control block 540 contains both the specific high-level instructions for operating the controller 500, including selecting among control functions if multiple functions are supported, and the compiler (or interpreter) module for translating these into instructions processed by CPU 512. Storage 516 includes an operating system 550, which directs the execution of low-level, basic system functions such as memory allocation, file management and operation of storage device 514; and instructions defining a user interface 555, which may, again, drive a local display 532 or merely supply data to an interface program running on a separate device, but in any case providing status information and accepting operator commands. A communications module 560 drives network interface 535 via I/O bus 522 to receive signals from outside devices and transmit signals to outside devices.

Supporting the user's ability to interact with and configure the controller 500 are a pair of memory partitions 565, 570. Memory partition 565 stores user programming, e.g., portions or even the entirety of the control block 540 that defines the functionality of the controller 500 and operates CPU 512. General-purpose microcontrollers, for example, allow the user to completely specify the operation of the device, even the functionality of individual I/O ports, by writing the control program that the device executes; in these implementations, partition 565 may contain the entire control program. Embedded microcontrollers contain application-specific software and, often, hardware, but may allow the user to select, replace or modify particular portions of the program. In such implementations, partition 565 may contain libraries or program modules that the user can modify or replace. Memory partition 570 stores configuration parameter values selected by the user (e.g., schedule settings for a thermostat, administration profiles for an implanted medicinal pump, etc.).

An access-control circuit 105 as illustrated in FIG. 1 may be deployed at one or more locations within the architecture of the controller 500. In some embodiments, particularly when storage 516 (or, e.g., the volatile portion thereof) is deployed on a single chip, the access-control circuit 105 is disposed between address/data bus 518 and the entire storage 516. This results in a gatekeeping function across all memory interactions, which may not be desired. Instead, access-control circuit 105 may be situated so as to govern access only to one or both of the memory partitions 565, 570. These partitions may be deployed on separate chips, on a single separate chip, or as logical partitions of a single memory unit. Access-control unit 105 is readily adapted to any of these configurations. A deployment for access control over a single chip or a multiple-chip set is shown in FIGS. 1 and 3, but access-control unit can govern interaction with a portion of a memory chip or chipset by, for example, establishing the portion of the memory to be used, listening on the address lines, and activating/deactivating the access-control unit 105 according to the lock/unlock state for the relevant portion of memory.

Operation of the access-control unit 105 is as described above, with permission codes provided over data lines as the protected memory is accessed. Alternatively or in addition, the lock/unlock state may be set manually by a properly authenticated user via user interface 555 and programming in the control block 540 and/or controller-access programming running on a wireless user device. Similarly, this programming may allow the user, via user interface 555, to reprogram the state transitions, permission codes and other governing attributes of the access-control unit 105.

B.2 Smart Appliances and "Internet of Things" Applications

The so-called "Internet of Things" (IoT) refers broadly to the interconnection via the Internet of computing devices embedded in everyday appliances and devices, enabling them to send and receive data. Users can control IoT-enabled household systems such as heating and ventilation systems, sprinkler systems and home-security systems using a smart phone or other Internet-connected device. More broadly, farmers use IoT systems to monitor water quality and atmospheric and soil conditions, and transportation authorities monitor real-time traffic patterns to alter traffic-signal timing. Such capabilities greatly expand convenience and flexibility, but like any functionality accessible over the Internet, pose security and privacy risks. The consequences of a successful hack of a residential or commercial alarm system are obvious, but even for applications that do not involve critical systems, the potential for harm is significant. IoT devices may store passwords, credit-card numbers or other sensitive data to facilitate convenient upgrades, and researchers have demonstrated the ability to intercept unencrypted data from a smart meter device to determine what television show someone was watching at that moment.

Figure 6:
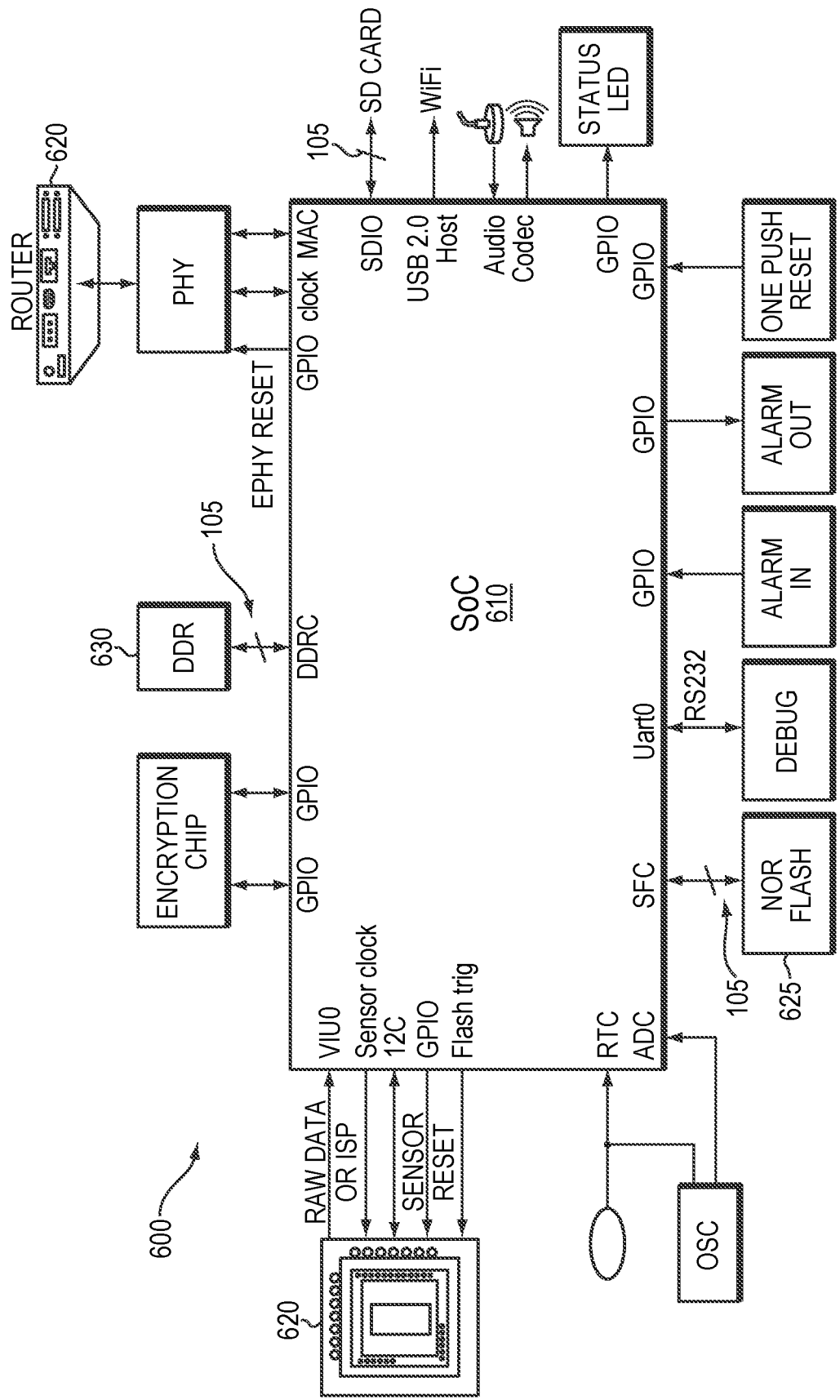
FIG. 6 schematically illustrates an Internet Protocol (IP) camera system in accordance with various embodiments of the invention.

One widely used IoT application is an IP (Internet Protocol) camera used primarily for surveillance. Unlike analog closed-circuit television (CCTV) cameras, an IP camera can send and receive data via a computer network such as the Internet. FIG. 6 illustrates an IP camera system 600 that utilizes a SoC 610 (such as the Hi3518C SoC supplied by HiSilicon Technologies, Ltd.) and a conventional image sensor 615. The SoC 610 receives image data from image sensor 615 and creates high-definition video for transmission over IP via a router 620. IP camera SoC devices include processing capacity to execute image processing and encoding, and may support additional features such as lens distortion correction. Firmware implementing these functions is stored in a non-volatile NOR Flash memory 625, with which SoC 610 interacts via an SPI Flash controller (SFC). The Flash memory 625 may be accessed via router 620 and the physical (PHY) layer, for example, to permit the SoC vendor to replace or modify the firmware stored thereon. User identity or password information may also be stored in NOR Flash memory 625. Although a commercial IP camera SoC typically does not accommodate user modification to the internal programming, other IoT devices may allow the user to select, replace or modify particular portions of the firmware.

The SoC 610 may also include interfaces for external memory and removable memory cards. For example, an SDIO interface connects an internal memory controller to a non-volatile memory card, e.g., a Secure Digital (SD) memory card 630. When SD card 630 is detected, the SDIO interface becomes active, storing on the SD card successive frames of image data received from the image sensor 615 for later playback. A DDRC interface connects an internal memory controller of SoC 610 to a permanent bank of volatile memory 630 (e.g., double data rate synchronous dynamic RAM) to accommodate integration of SoC 610 in devices, such as computers or stand-alone cameras, that include on-board volatile memory. Once again, when external memory is connected to SoC 610 via the DDRC interface, frames of image data received from the image sensor 615 are stored in the external memory.

The access-control circuit 105 may be deployed across the data and/or control lines of one or more of the DDRC, SDIO or SFC. For example, if the SoC 610 is configured to read and write memory over a single memory bus (see FIG. 5), the access-control circuit 105 may be connected to "listen" to the data lines of the memory bus and to switch the control lines of the SDIO, DDR and/or Flash memory controllers. Connection across the Flash memory control and/or data lines prevents an attacker from gaining access to the SoC firmware and, if present, stored user data by "spoofing"—that is, posing as the vendor or other authorized party and reading or writing the data in Flash memory 625 via router 620. Connection across the data and/or control lines between the SD card or external memory and SoC 610 prevents an attacker from accessing stored video data (e.g., once again, by communicating with SoC 610 via router 620 and posing as an authorized user). For example, a thief may utilize access to a video feed from a surveillance camera to determine when the monitored premises are empty of occupants and therefore vulnerable.

More generally, for IoT devices, access-control circuit 105 can be integrated within a SoC or deployed as a separate component on the device printed circuit board to protect memory that can be accessed by routine user command or by the vendor with an enhanced permission level (which can be spoofed).

B.3 Automotive Applications

As the mechanical functions performed by various systems in an automobile have either been replaced entirely by electronic alternatives or subjected to electronic control, automobiles have evolved so they now resemble unified computational entities rather than collections of interoperating electromechanical systems. An electronic engine-control unit (ECU), for example, receives real-time operating data from sensors and operates the engine in a manner consistent with user commands and safety requirements. The ECU is essentially a computer that monitors operating data, mediates between driver commands and mechanical responses thereto (e.g., operating antilock breaks to avoid hazards that would result from blind response to a user's sudden pressure on the pedal), and implements advanced autonomous functions such as cruise control. Repair personnel diagnose anomalies through computational interaction with the ECU rather than (or in addition to) visual and mechanical inspection. This necessitates a communication platform facilitating data retrieval from the ECU and, to varying degrees depending on the task, external operation or testing of various automotive systems via the ECU. For vehicles to operate autonomously, with a passive or even absent driver, it is likely they will have to communicate wirelessly with nearby vehicles and traffic-control installations. As ECUs evolve, they will assume greater responsibility for external communication.

Figure 7:
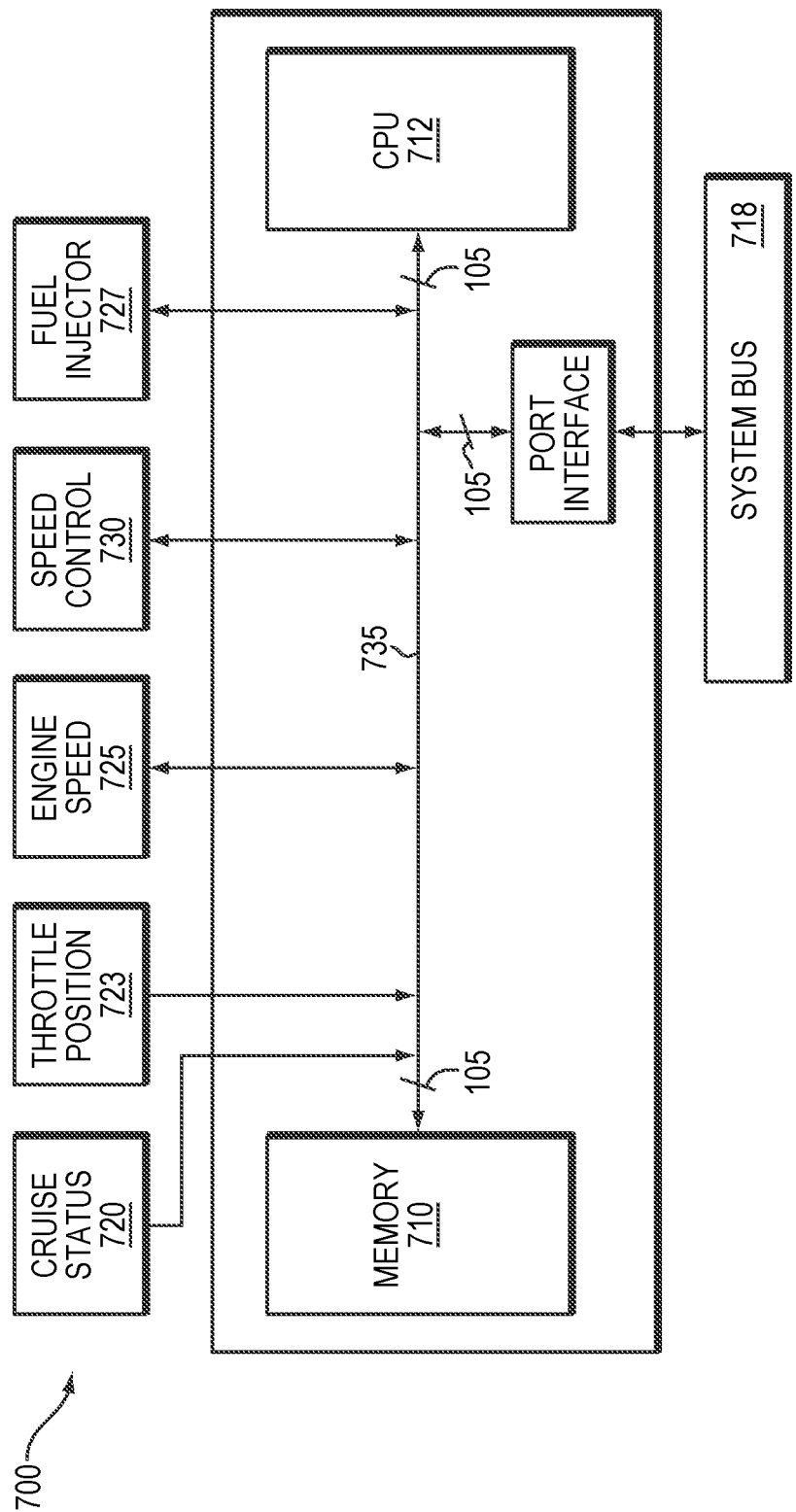
FIG. 7 schematically illustrates an electronic engine-control unit in accordance with various embodiments of the invention.

These existing and emerging capabilities provide pathways for hackers to gain access to stored vehicle or operator data or even to assume control of a vehicle remotely. FIG. 7 shows a representative ECU 700 with conventional capabilities. The ECU includes a memory 710, which may include volatile and non-volatile components; a CPU 712, and a port interface 715 connected to a system bus 718 that provides a communication link to other vehicle systems. CPU 712 executes program instructions stored in memory 710 to control and monitor engine performance. ECU 700 also includes a variety of distributed sensors and controls used to monitor and control the engine. The sensors include a cruise-status sensor 720, throttle-position sensor 723, and an engine-speed (RPM) sensor 725 that senses and reports the rotational speed of the tail shaft of the vehicle transmission. For example, sensor 725 may be a magnetic sensor located on the tail shaft that generates an analog or digital signal encoding the rotation rate. ECU 700 can control the rate at which fuel is provided to the engine's cylinders by issuing control signals to a fuel injector system 727, and a speed-control unit 730 computes the vehicle's road speed using the sensed speed of rotation received from sensor 725. (An alternative way to measure speed would be to monitor a value provided by a radar system or an antilock braking system (ABS) monitoring a wheel's rotation.) If desired, an acceleration variable may be derived from the monitored engine speed, vehicle road speed, or both. Based on the sensed vehicle speed and, possibly, the computed acceleration, ECU 700 may, if cruise control is engaged, send control signals to fuel injector system 727 to maintain a target vehicle speed. The various components of ECU communicate over an internal bus 735.

Memory 710 may contain one or more circular buffers for storing, over a rolling interval, data from sensors 720, 723, 725, as well as the cruise status and values of the control signals generated by ECU 700. This data is available to technicians via port interface 715 using a wired or wireless connection through a suitable interface connected to bus 718; for example, a technician may use a wireless phone or tablet as a client device interacting with ECU 700, which may be programmed to behave as a server. Memory 710 may contain programming for diagnostic routines that are executed by CPU 712 upon commands received via bus 718 by an authorized client, and these diagnostic routines will themselves result in reporting of data back to the requesting client. The vehicle of which ECU 700 is a part may have other control units responsible for different vehicle functions, e.g., operating audio and navigation systems, and these may be connected to system bus 718 and communicate with (and obtain data from) ECU 700, also via port interface 715. For example, the navigation system may utilize the current and recent vehicle speeds to estimate a time of arrival at a programmed destination. An autonomous driving system may not only communicate with but override the normal operation of ECU 700 depending on the degree of autonomy and driving conditions.

As illustrated in FIG. 7, the access-control circuit 105 may be deployed across the data and/or control lines of one or more of the memory 105, the port interface 715, or the CPU 712. Most straightforwardly, an access-control circuit 105 connected across the control lines of memory 710 (or portion thereof) can prevent access to stored data by a hacker who, for example, provides a technician's credentials and is improperly authenticated by CPU 712. In some circumstances, this may not be sufficient; for example, CPU 712 may contain onboard (e.g., cache) memory subject to interrogation and data theft, and ECU 700 may itself serve as a gateway to other vehicle systems, enabling access to data stored thereon. Hackers may also seek to seize control of ECU 700 remotely rather than merely extracting data from memory 710. To prevent hijacking of the functionality of ECU 700, the access-control circuit 105 may be located between internal bus 735 and port interface 715 and/or CPU 712. A similar deployment is used when ECU 700 is implemented in a SoC configuration with memory 710 and CPU 712 integrated on a single chip. In these configurations, access-control circuit 105 may disable (until it is unlocked) control lines enabling operation of the port interface or CPU. For example, the access-control circuit 105 may have a separate connection to system bus 718 so it can listen to data traffic that will include lock/unlock control signals. In SoC implementations, the governed circuitry may be more limited; for example, access-control circuit 105 may only restrict data transfer to and/or from internal system memory without affecting operation of the CPU and interface (i.e., in a manner analogous to deployment across the control lines of a stand-alone memory chip).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A security device comprising:
   read enable (RE) input and output terminals;
   write enable (WE) input and output terminals;
   a plurality of input lines connectable to data lines of a device to be protected;
   an RE switch intervening between the input and output RE terminals;
   a WE switch intervening between the input and output WE terminals; and
   a lock unit connected to the input lines and the switches, the lock unit comprising:
      a decision logic block for (i) detecting a command signal on the data lines, (ii) detecting a permission code on the data lines, (iii) upon validating the permission code detected on the data lines, decoding the command signal and generating a lock/unlock state associated with the RE and WE switches in response to the decoded signal, and (iv) during the decoding and lock/unlock-state generation, opening the switches to prevent signals on the input terminals from reaching the output terminals;

a non-volatile memory for storing the lock/unlock state; and circuitry responsive to the non-volatile memory for operating the RE and WE switches in accordance with the lock/unlock state.

2. The device of claim 1, further comprising:

chip enable (CE) input and output terminals; and a CE switch intervening between the input and output CE terminals.

3. The device of claim 1, wherein the lock/unlock state comprises a WE result and a RE result.

4. The device of claim 3, wherein the circuitry responsive to the non-volatile memory comprises a volatile latch for receiving the state from the non-volatile memory and latching the state, and logic circuitry for applying the latched state to the switches.

5. The device of claim 4, wherein application of the latched state to the switches closes the RE switch only if the RE result is positive and closes the WE switch only if both the RE and WE results are positive.

6. The device of claim 5, wherein the logic circuitry comprises first and second OR gates receiving inputs from the latch and from a soft lock line of the decision block, the soft lock line being high only during decoding and unlock-state generation and otherwise being low.

7. The device of claim 1, wherein the switches are CMOS gates.

8. The device of claim 1, wherein the command signal includes the permission code.

9. The device of claim 8, further comprising memory, accessible by the decision logic block, for storing a one-time pad base, the decision logic block being configured to compare the permission code to an entry in the one-time pad base.

10. The device of claim 8, further comprising memory, accessible by the decision logic block, for storing a shared secret, the decision logic block being configured to compare the permission code to the stored shared secret.

11. The device of claim 8, wherein the decision logic block is further configured to respond to an invalid permission code by not processing permission codes and/or command signals for a first time interval.

12. The device of claim 11, wherein the decision logic block is further configured to respond to a second invalid permission code detected after expiration of the first time interval by not processing permission codes and/or command signals subsequently applied to a CE input terminal for a second time interval longer than the first time interval.

13. The device of claim 1, wherein the decision logic block decodes the command signal only when the command signal is detected within a predetermined interval followed by or following detection of the permission code.

14. A controller comprising:

an output interface for causing performance of at least one control function;

a memory including stored control instructions;

a processor for executing the stored control instructions and operating the output interface in accordance therewith; and a security device governing access to at least a portion of the memory to be protected, the security device comprising:

a plurality of switches connected to at least one control line of the memory to be protected;

a plurality of input lines connected to data lines of the memory to be protected; and a lock unit connected to the switches, the lock unit comprising:

a decision logic block for (i) detecting a command signal on the data line, (ii) detecting a permission code on the data line, (iii) upon validating the permission code detected on the data line, decoding the command signal and generating a lock/unlock state associated with the switches in response to the decoded signal, and (iv) during the decoding and lock/unlock-state generation, opening the switches to prevent access to the memory to be protected;

a non-volatile memory for storing the lock/unlock state; and circuitry responsive to the non-volatile memory for operating the switches in accordance with the lock/unlock state.

15. The controller of claim 14, wherein the memory to be protected comprises read enable (RE) input and output terminals and write enable (WE) input and output terminals, the switches comprising an RE switch intervening between the input and output RE terminals and a WE switch intervening between the input and output WE terminals.

16. The controller of claim 15, further comprising chip enable (CE) input and output terminals and a CE switch intervening between the input and output CE terminals.

17. The controller of claim 15, wherein the lock/unlock state comprises a WE result and a RE result.

18. The controller of claim 14, wherein the circuitry responsive to the non-volatile memory comprises a volatile latch for receiving the state from the non-volatile memory and latching the state, and logic circuitry for applying the latched state to the switches.

19. The controller of claim 18, wherein application of the latched state to the switches closes the RE switch only if the RE result is positive and closes the WE switch only if both the RE and WE results are positive.

20. The controller of claim 19, wherein the logic circuitry comprises first and second OR gates receiving inputs from the latch and from a soft lock line of the decision block, the soft lock line being high only during decoding and unlock-state generation and otherwise being low.

21. The controller of claim 14, wherein the decision logic block decodes the command signal only when the command signal is detected within a predetermined interval followed by or following detection of the permission code.

* * * * *